United States Patent [19]
Bettels

[11] Patent Number: 5,678,045
[45] Date of Patent: Oct. 14, 1997

[54] METHOD AND APPARATUS FOR MULTISCRIPT ACCESS TO ENTRIES IN A DIRECTORY

[75] Inventor: Jürgen Bettels, Tannay, Switzerland

[73] Assignee: Digital Equipment Corporation, Maynard, Mass.

[21] Appl. No.: 163,244

[22] Filed: Dec. 6, 1993

[51] Int. Cl.⁶ ............................................. G06F 17/30
[52] U.S. Cl. ........................ 395/616; 395/757; 395/758
[58] Field of Search ........................ 395/600, 200, 395/601–622, 605, 616; 364/282.3, 282.4

[56] References Cited

U.S. PATENT DOCUMENTS

| | | | |
|---|---|---|---|
| 5,148,541 | 9/1992 | Lee et al. | 395/600 |
| 5,313,598 | 5/1994 | Yamakawa | 395/375 |
| 5,377,323 | 12/1994 | Vasudevan | 395/200 |
| 5,423,948 | 6/1995 | Davis et al. | 395/800 |
| 5,491,817 | 2/1996 | Gopal et al. | 395/616 |

OTHER PUBLICATIONS

Information Technology —Open Systems Interconnection —The Directory —Part I, Part II, pp. 3–8, 1990.
"An Enhanced Electronic Mail System", Katsumata et al., NTT Network Information Systems Laboratories, IEEE Region 10 Conference, Tencon 92, pp.664–668 Nov. 1992.
"Netware 4.0 heralds detents in NOS wars: Network Operating Systems", Tanya Pobuda, Computing Canada, v19, n8, p.49(2) Apr. 1993.
"Novell, Banyan, SUn pushing to unite directory services", Jane Morriseey, v6, n33, p1(2) Aug. 1989.

*Primary Examiner*—Thomas G. Black
*Assistant Examiner*—Hosain T. Alam
*Attorney, Agent, or Firm*—Diane C. Drozenski; Ronald C. Hudgens; Arthur W. Fisher

[57] ABSTRACT

A system and method for providing multiscript aliasing of, and access to name entries in a directory information tree (DIT) stored in one or more Directory Service Agent (DSA) servers, such as in a distributed DIT. Where DIT original entry objects are expressed in a first script, the system provides aliases of the entry objects names in at least one alternative script. An alias object is generated using the alternative-script version of the entry, and is provided with a pointer such as to the original entry object. A request such as a search or look-up using the alias object, i.e. using the name as expressed in the alternative script, will be reformulated into a request using the original entry object, i.e. using the name as expressed in the original script. Another pointer is provided from the original entry object back to each such alias object. When the original entry object is to be deleted, the system first searches for all aliases of the entry object, by using the pointer(s). The alias objects are deleted first, followed by a deletion of the original entry object. The system for generating the aliases and pointers may be implemented as a Directory User Agent (DUA) application resident in an end user's work station or computer, while the DIT management application is stored in the servers. Alternatively, the system may be implemented as an application stored in the servers, with the user station(s) storing software capable of initiating the necessary operations.

13 Claims, 6 Drawing Sheets

430 {
| Object ID | |
|---|---|
| (pointer to parent) | |
| pointer to object 420 | |
| (other child pointer(s)) | |

440 {
| Attribute Name | Attribute Value |
|---|---|
| common name | Isomato Takahashi |
| address | (address value) |
| telephone number | (telephone number value) |
| alias1 | (alias1 value) |
| alias2 | (alias2 value) |
| ... | ... |

| Object ID | |
|---|---|
| common name | Isomato Takahashi (JIS208) |
| parent pointer | pointer to object 410 |
| ... | ... |

METHOD AND APPARATUS FOR MULTISCRIPT ACCESS TO ENTRIES IN A DIRECTORY

BACKGROUND OF THE INVENTION

With the ever-increasing use of electronic communications and the proliferation of international networks that constantly exchange information through network services such as the Internet, global access to such information is becoming increasingly important. Computer networking has become an essential part of business for a large number of organizations, including commercial enterprises (employees and departments within companies as well as the companies as a whole), universities and private individuals. Virtually instantaneous global communication has arrived and is rapidly expanding.

Crucial to such communication is the ability to correctly address electronic mail (email) and other information sent by one user to another. It is standard for a user in the United States to send email to colleagues in Europe, Japan or elsewhere as a matter of course, replacing conventional postal services as the routing communication channel.

The fundamental requirement of correctly addressing information to be sent necessitates directory services that can provide the user with the (electronic) address of another user to whom the first user wishes to email a message or a file. Some such directories are available today, but they are limited in scope, generally covering only the users in a local domain.

As network communications evolve into truly global communications, both within and between organizations, a need for concomitantly broad, global directories has developed. Preferably, such a directory will conform to a standard international protocol, such as that proposed by the International Organization for Standardization (ISO) in conjunction with the Comité Consultatif International Téléphonique et Télégraphique (International Telephone and Telegraph Consultative Committee: CCITT); the proposed standard is the Open Systems Interconnection (OSI) Directory standard, specifically the X.500 standard, ISO/IEC 9594 published by the ISO and IEC (International Electrotechnical Commission), and is incorporated herein by reference.

The X.500 standard is designed to store and maintain information objects, which may contain information about organizations and individuals, such as names, addresses, telephone numbers, and so on, which are stored hierarchically in a Directory Information Tree (DIT). The entries may include country names, organization names, organization units, locality names, and the surnames and common (given) names of individuals.

Problems arise in attempting to make international use of a system such as X.500. There are numerous languages in use around the world, and consequently numerous alphabets or scripts to accommodate these languages. English may be encoded in a Latin-character script by using the conventional "PrintableString" encoding (which for the most part is identical to ASCII code). Japanese, on the other hand, is expressed in a script that accommodates that language, such as Kanji or Katakana, using a code such as the standard JIS208 code specified by T.61 (discussed below). JIS208 is a very general code allowing encoding of words in Kanji, Katakana or Hiragana, in addition to Latin-character encoding and encoding of certain other alphabets.

When a directory entry is made in, for instance, a Latin script according to PrintableString, references to that entry (such as in a look-up operation) may be made using a different encoding for the same name, such as a JIS208 encoding. However, if the original entry is "XYZ" in Latin characters, then the alternative encoding must also spell "XYZ" in Latin characters; different spellings or alternate versions of the name represented in different scripts than the original are not directly supported by X.500. As a result, if a Japanese employee's name is stored as a directory entry using a Latin-character script, a user in Japan cannot look up that name in its Kanji form; rather, the user must first transliterate the name into a Latin-alphabet form, and then look it up in the directory. Similarly, any electronic mail addressed to that employee must always be addressed using a Latin-alphabet form of the name (regardless of the particular encoding used).

This presents barriers to the use of the directory, and may entirely block it use if the user cannot determine the proper transliteration or translation into the appropriate script.

The same problem occurs when an organization maintains its directories using a local script (such as Kanji), and another user attempts a look-up or sends email using a version of the name expressed in Latin characters; the mail will not be delivered correctly, since the addresses do not match.

A system is needed, then, that presents the user with transparent access to a directory and electronic mail without requiring the user to convert names or addresses to the original script of the directory, but allowing multiscript access to the directory entries.

SUMMARY OF THE INVENTION

A mechanism is provided for systematically creating synonym names for entries in an Directory Information Tree (DIT), where the synonym names are expressed in scripts other than that in which the original entries were created. This is done by generating an alternative name as an attribute of a primary entry object, and then generating an alias object including that alternative name, with the alias object including a pointer to the primary object. When a look-up or search operation is executed using the alias, the pointer leads to the primary object and all attributes may thereby be directly accessed and returned to the user. The primary object is also provided with a pointer back to each alias, of which there may be several. When the primary object is to be deleted, each alias is first sought via the pointer(s), and is deleted. The pointer from the primary object to the alias object can be achieved by making the alias object a child of the primary object.

BRIEF DESCRIPTION OF THE DRAWINGS

FIGS. 4A and 4B show the structures of objects shown in FIG. 4.

DESCRIPTION OF THE PREFERRED EMBODIMENTS

The present invention is described in terms of the above-mentioned X.500 standard for directories. However, it may be implemented in any system that provides for a directory information tree where the entries are encoded in a given script, and others may wish to access information of the directory by reference to alternative names using one or more scripts different from directory's script.

"Script" is used herein to refer to a specific alphabet or character set, such as the Latin alphabet, Kanji, the Hebrew alphabet, and the like. A given script may have many encodings available; for instance, the Latin alphabet may be encoded using PrintableString, or the Latin-character subset of T.61/JIS208, or using Unicode's Latin-character encoding. These are all equivalent for the purposes of X.500, since whenever a look-up request is made, the code in which the requested entry is expressed is specified, and X.500 decodes the entry name in order to search the Directory Information Tree (DIT).

In the following discussion, it will be helpful to refer to the ISO/IEC 9594-1 Recommendation for X.500, which includes definitions and descriptions of each of the levels of the directories used in the examples of FIGS. 1—4B.

Figure 1:
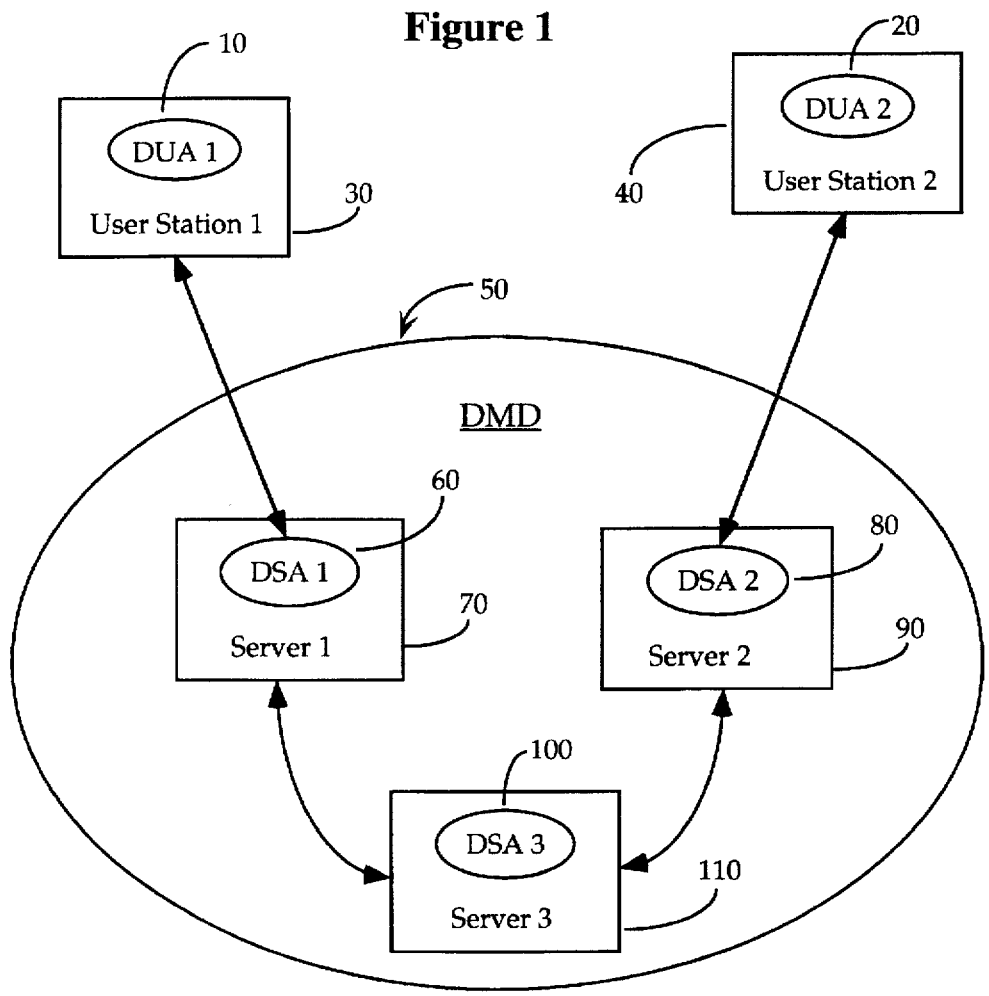
FIG. 1 is a block diagram showing an exemplary hardware system for implementing the present invention.

FIG. 1 is a diagram of a system for implementing a directory information base (DIB). It includes a directory management domain (DMD) 50, which would typically be distributed over a number of servers 70, 90 and 110 on an organization's network. Each server includes a processor and a memory storing a directory system agent (DSA), namely DSAs 60, 80 and 100, respectively. The DSAs are applications that communicate with one another, and may pass searches or look-up requests from one to another, since in general each will hold only certain parts of the total directory information.

A user at a station communicates to one of the DSAs via a directory user agent (DUA) such as DUA 10, which is an application resident in a memory of an end-user station 30 (which has its own processor), or DUA 20 resident in a memory of end-user station 40, which also includes its own processor. The stations may be work stations, networked microcomputers, or the like.

Figure 1A:
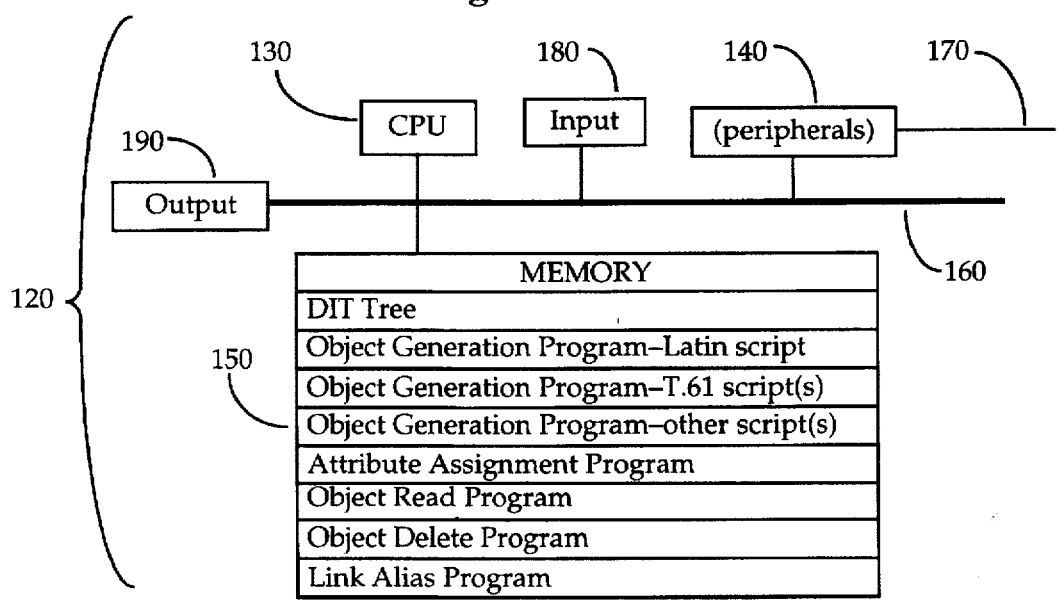
FIG. 1A is block diagram of a server of the invention showing memory organization.

FIG. 1A is a block diagram of a server system 120, with a structure used by any or all of the servers 70, 90 and 110. Each such server system 120 includes a CPU 130 coupled to a program memory 150 storing the programs indicated there, whose functions are explained below. In this embodiment, the object generation programs for different scripts are resident in the DSAs, though as discussed below any subset of them may be stored in one or more DUAs.

The CPU 130 in FIG. 1A is coupled via a bus 160 to peripherals 140 (including, for instance, a network interface and/or a modem), which are in turn coupled to other DSAs and DUAs via a communication or network bus 170. The server system 120 includes one or more input devices 180 (such as keyboards, trackballs, etc.) for input of information and retrieval requests. Output device 190 may be a monitor, printer or any other device to provide user feedback and display of retrieved information.

Figure 5:
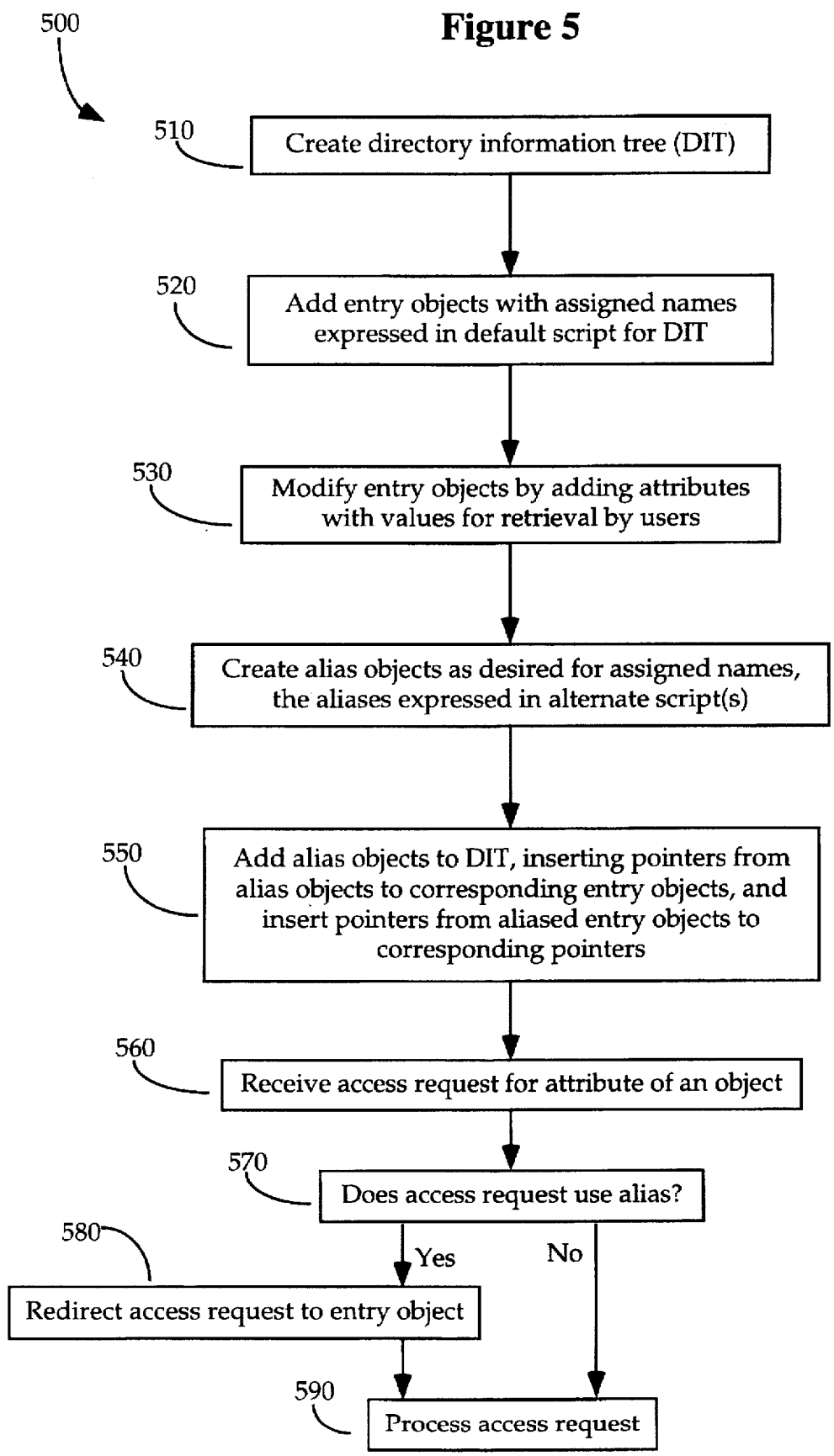
FIG. 5 is a flow chart of a method of the invention.

FIG. 5 is a flow chart 500 of the method of the invention for creating and accessing the information base, the individual steps of which are detailed in the following discussion.

Figure 2:
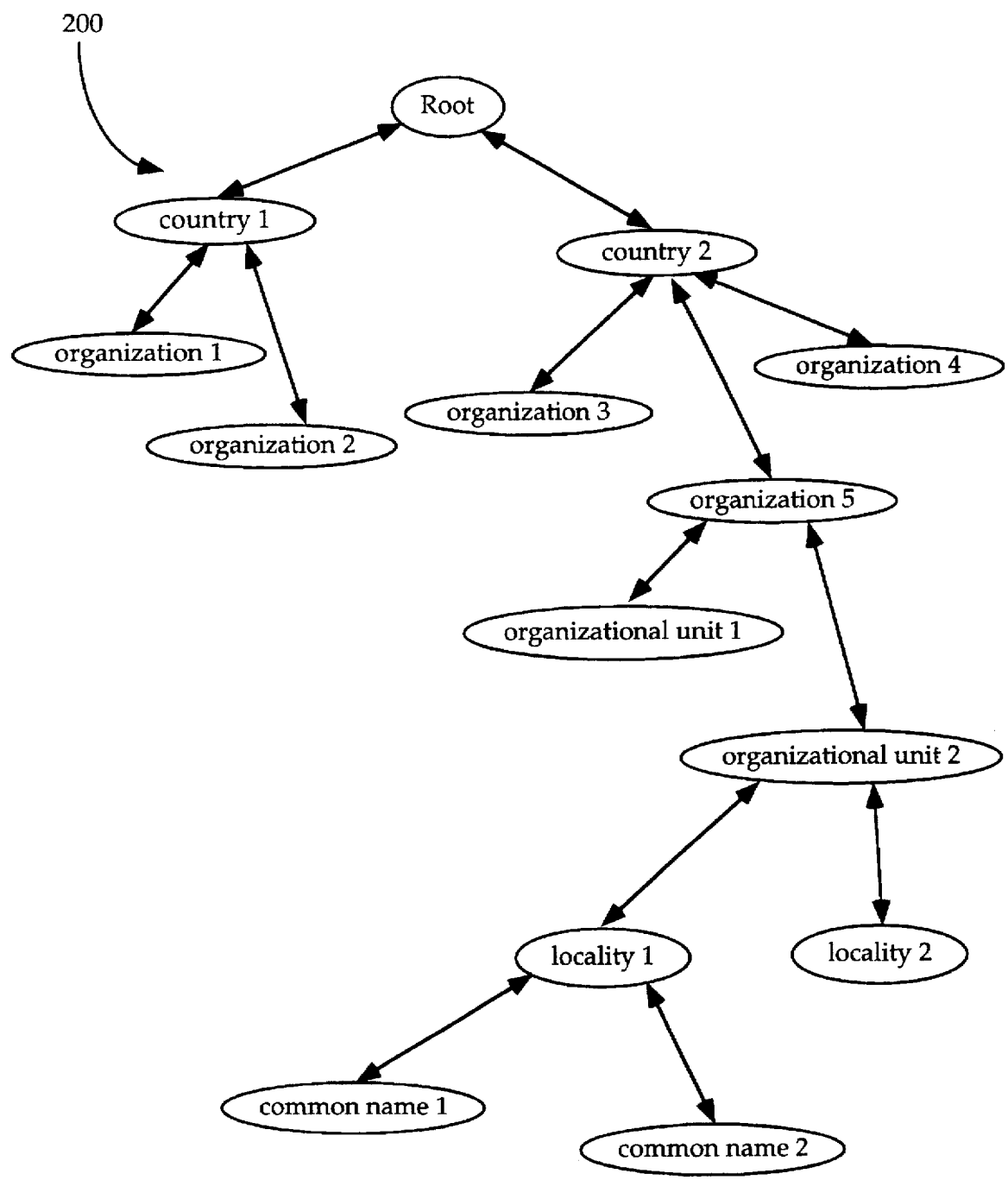
FIG. 2 shows an organizational tree of a directory information base (DIB) in connection with which the present information may be used.

The first step 510 in FIG. 5 is to create a directory information tree (DIT). A typical DIT 200 is shown in FIG. 2. It includes entries for countries, organizations, organization units within those organizations, locality names, and common (personal) names. These entries may be abbreviated as follows:

TABLE 1

| c | countryName |
| o | organizationName |
| ou | organizationUnitName |
| l | localityName |
| cn | commonName |

Each entry in the DIT of FIG. 2 is an information object containing the relevant information. The full name of an entry is determined by its Distinguished Name (DN), which specifies the path through the tree.

Figure 3:
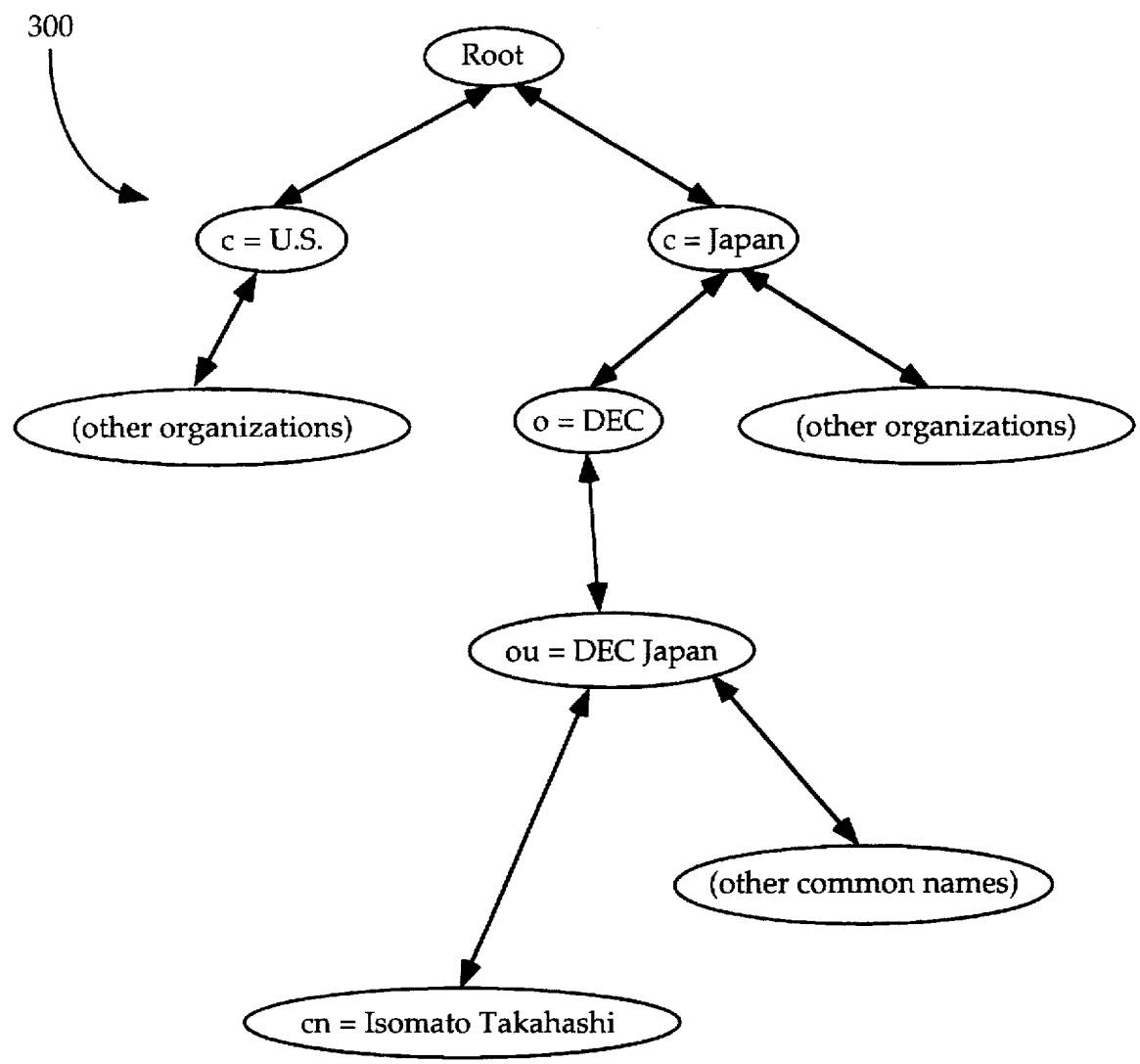
FIG. 3 is a specific example of a DIB with an individual's entry.

FIG. 3 shows a more specific implementation of the a tree like that of FIG. 2, where certain entries are filled in, i.e. the user has entered attribute values for attributes of the entry object (see steps 520 and 530 in FIG. 5). This figure shows the position in a DIT 300 of an individual named Isomato Takahashi, who works at DEC Japan, which is an organizational unit under DEC, which is itself under the country entry for Japan. When someone wishes to look up information relating to Mr. Takahashi, he or she makes an inquiry such as the following:

read entry . . . /c = Japan/o = DEC/ ou = "DEC Japan"/cn ="Isomato Takahashi" (PrintableString) – attribute telephoneNumber (The ". . ." indicates that there is some unspecified initial path from the root to the first specified entry, here "c=USA". This initial path will be assumed in subsequent examples.)

The above "read" inquiry will retrieve the telephone number for Mr. Takahashi. Note that the encoding used to specify the entry is identified (i.e. PrintableString), so that the DIT is informed how to decode the entry for the search.

If the user knows only the original Japanese form of Mr. Takahashi's name (i.e. the Kanji form of the name), or finds it inconvenient or difficult to determine the PrintableString version of the name, then provision should be made for this. Without this capability, the system is not truly international, but rather forces all users to learn Latin-script versions of any information to be searched or looked up (where the DIT entries were created using a Latin script).

To meet this need, the following basic steps are executed to create one or more alternative-script aliases for any desired entry, where the alias is accessible directly using a local-language alphabet or script:

Creating an Alias for Look-up Operations

Step 1. Add DIT entry for desired name, using DIT's original script. (See step 520 of FIG. 5.)

Step 2. Modify the entry to add another value, using the desired local-language script, and specifying the encoding. (See step 540 of FIG. 5.)

Step 3. Make the added value an alias of the original entry, using the local-language script. (See step 550 of FIG. 5.)

A Japanese user of the system is likely to want to conduct all searches and look-ups using a Japanese script, i.e. an encoding of Kanji, Katakana or Hiragana. These scripts are provided by "T61String", which is an 8-bit encoding that permits one to invoke any one of many 94-character sets registered with the ISO registry for escape sequences for the ISO/IEC 2022 protocol. As mentioned above, both Kanji and Katakana script can be encoded according to T.61/JIS208.

Another encoding set available is UniversalString or 10646String, which includes the Universal Character Set Code ISO/IEC 10646, as described in *ISO/IEC International Standard* 10646-1 (1993), prepared by the ISO and IEC Joint Technical Committee ISO/IEC JTC1 under the general title *Information technology—Universal Multiple-Octet Coded Character Set* (UCS) (1993), and incorporated herein by reference.

To create a T.61/JIS208-encoded alias for the "DEC Japan" entry, steps 1-3 above take on the form of the following pseudocode:

---

(1) add entry /c = Japan/o = DEC/ou = "DEC Japan"(PrintableString) – attributes: class = organizationalUnit, – telephoneNumber =+81 –(3) –3989711

(2) modify entry /c = Japan/o = DEC/ou = "DEC Japan" (PrintableString) –add value ou = [Kanji form of "DEC Nihon"] (T61/JIS208)

(3) add entry /c = Japan/o = DEC/ou = [Kanji form of "DEC Nihon"] (T61/JIS208) – class = (alias, organizationalUnit Alias), – aliasedObjectName = /c = Japan/o = DEC/ou = "DEC Japan"

---

Figure 4:
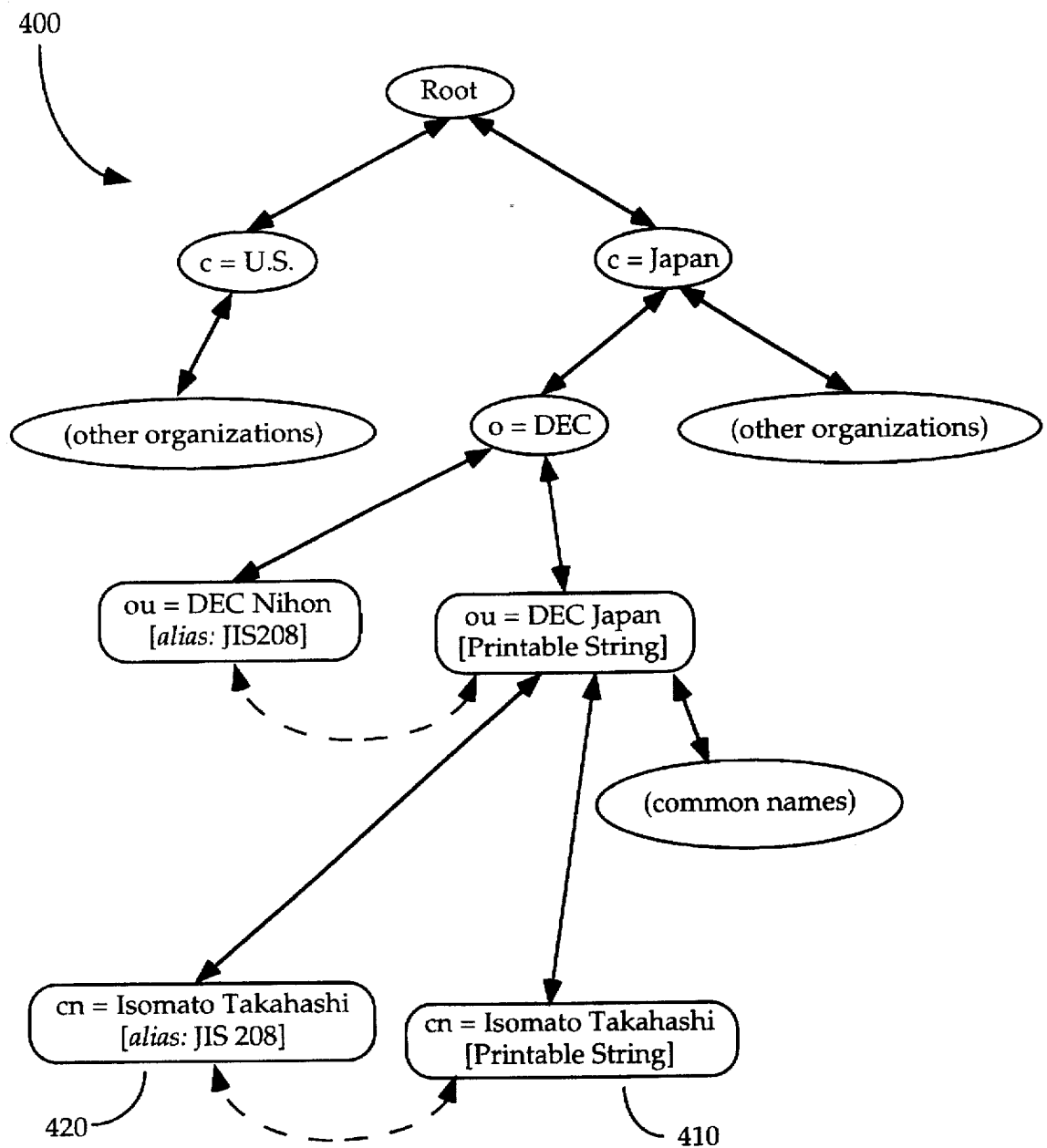
FIG. 4 shows the use of aliases for international use in connection with the DIB of FIG. 3.

The "add entry" step adds the entry for "DEC Japan" into the tree, resulting in the entry "ou=DEC Japan" as in FIGS. 3 and 4. This step also enters the telephone number for the organizational unit.

The entry is then modified to add an additional attribute value of the entry name "DEC Japan", namely "ou=[Kanji form of "DEC Nihon"]" ("Nihon" being the Japanese word for "Japan"). The new attribute value is encoded using the JIS208 encoding standard for Kanji.

After step 2 is carried out, anyone wishing to inquire about DEC Japan's telephone number may conduct a search using either the Latin-character version or the Kanji version of the name. If the Kanji form of the name is searched, then the system will return the DN for "DEC Japan" as PrintableString. If the user then wishes to conduct a look-up operation to determine some attribute of the entry (such as find out the telephone number), he or she must conduct the look-up for the telephone number in a subsequent action, this time using the PrintableString-based DN. This is because the X.500 standard, while allowing more than one attribute value, does not directly support alternative names with different spellings (here, different scripts). The additional attribute value (i.e. the alternatively-scripted name) would be retrievable in a search, but preferably only the original value (the Latin-character name) is used for the construction of DN name paths.

As a result, although step 2 above allows a search to be conducted using "[Kanji form of "DEC Nihon"]", a direct look-up (to retrieve attribute values) is not possible. For this purpose, step 3 is used, specifying that the "[Kanji form of "DEC Nihon"]" value is of the class "alias", and in particular is an alias for an organizationalUnit. The last line of "add entry" links the alias "[Kanji form of "DEC Nihon"]" with "DEC Japan" as the aliased object name.

By execution of step 3, the structure of the DIT 300 is modified as in FIG. 4, where DIT 400 includes the JIS208-encoded alias "DEC Nihon" (in Kanji), the dotted arrow to "DEC Japan" indicating that the latter is the aliased object, i.e. that the "DEC Nihon" entry points to "DEC Japan" as the aliased object.

A user may now look up either "DEC Japan" (in PrintableString script) or "DEC Nihon" in Kanji script, using the JIS208 encoding or any other Kanji encoding of which the DIT has knowledge, and access information about DEC Japan exactly as if he or she had looked up under "DEC Japan". (See steps 560–590 of FIG. 5.) Given the DIT of FIG. 4, the following two pseudocode statements are functionally identical:

--- read entry /c = Japan/o = DEC/ou = "DEC Japan" (PrintableString) – attribute telephoneNumber
and
read entry /c = Japan/o = DEC/ou = [Kanji form of "DEC Nihon"] (T.61/JIS208) – attribute telephoneNumber

---

In either case, the telephone number for DEC Japan is returned, and the user is not even aware that the entered value was (or had) an alias.

The second "read" command above, using the Kanji form of the company (ou) name, is automatically reformulated by the DSA as a request directed to the "DEC Japan" entry object. This is a straightforward matter of redirecting the request to the appropriate entry object in the DIT, using the PrintableString-expressed name instead of the Kanji-expressed name.

The user/nay determine whether a given entry object has any aliases by entering the following:

--- read entry /c = Japan/o = DEC/ou = "DEC Japan" (PrintableString) – attribute alias

---

This inquiry would return the value "DEC Nihon" (in Kanji form) in JIS208.

Steps 1–3 above are repeated for every original-script entry for which a non-original-script alias is desired. To create a Kanji alias for the common name "Isomato Takahashi", the following instructions are entered by the user:

---

(1) add entry /c = Japan/o = DEC/ou = DEC Japan/cn = "Isomato Takahashi" (PrintableString) – attributes: class = commonName (2) modify entry /c = Japan/o = DEC/ou = DEC Japan/cn = "Isomato Takahashi" (PrintableString) – add value
cn = [Kanji form of "Isomato Takahashi"] (T61/JIS208)

(3) add entry /c = Japan/o = DEC/ou = DEC Japan/cn = [Kanji form of "Isomato Takahashi"] (T61/JIS208) class = (alias, surname Alias), – aliasedObjectName = /c = Japan/o = DEC/ou = DEC Japan/ cn = "Isomato Takahashi" (PrintableString) –

---

Once the foregoing is entered, a user may access information using either the Kanji or the Latin-character version of "Isomato Takahashi" (using the appropriate encoding for the chosen, script), and receive identical results.

The access through the alias is transparent. However, for settings where this might not be the case, following is a routine suitable for accessing attributes (name, telephone number, etc.) of an entry by using its alias:

---

```
read (X, AttributeList)
{
    access object X
    if object X has alias object attribute {
        Y = alias object value
        access object Y
    }
    String = retrieved attribute(s)
    return (String)
}
```

---

This routine or its equivalent retrieves attributes in a list AttributeList from object entry X. However, if X turns out to be an alias object, the routine reroutes the read request to the aliased object, i.e. object Y. The routine sets the variable string to the values of the requested-and-retrieved attribute (s), and returns the string.

Typically, the local organizational unit (DEC Japan) would maintain a directory of its employees encoded in Kanji form so that the names can be properly used in mail and in documents. Latin-script aliases can be added for those names that are expected to be accessed from abroad.

By extension, every entry in the DIT (such as those listed in Table 1 above) may be given one or more aliases in one or more alternative scripts, and the entire directory information then becomes available to users of the system not familiar with the DIT's original script. This is particularly important for organizations whose members have names that are not normally expressed in Latin characters (since most DIT's are expressed using Latin-character scripts), but is also valuable for European languages that use characters not found in English or in the conventional PrintableString character set, such as the tilde (ñ) in Spanish, the umlaut ( ü) in German, and the cedilla (ç) in French. Speakers of these languages needn't modify the true spellings of names to be searched or looked up if aliases such as the above are provided.

Names in the system of the invention can thus be entered using any one of a variety of scripts, and all entries will be functionally equivalent. This allows true internationalization of the X.500 standard or another such protocol. Steps 1–3 enumerated above present a solution to the problem that X.500 does not directly support alternate spellings or scripting of names.

Implementing the Method in a DUA or DSA

A Directory User Agent will typically be a client application resident in a work station or a microcomputer, permitting a user to create new entries (as above), delete existing entries, and execute other operations, such as modifying, reading, listing, searching, and comparing names and their alternates. Where a DSA does not directly support the type of alternative spelling or encoding specified above, it is implemented at the DUA level Preferably, though, the DSA (including the X.500 standard or another protocol) will have the above-discussed multiscript aliasing capability built in, so that each user needn't load the application or application module necessary to implement steps 1–3 above at his or her own work station or processor.

A distinct advantage, however, of implementing the invention at the DUA level is that a given user or organization need not wait until an international standard such as X.500 is modified to begin realizing the efficiency of multiscript aliasing.

Deleting Entries

When a user deletes the primary entry (such as "DEC Japan"), all aliases of the entry should also be deleted. Thus, the delete operation for X.500 should be modified to do the following:

```
Upon delete command
    read entry object
        attribute alias object name
        /*Locate all aliases of entry to be deleted.*/
    delete aliases
    delete the entry object
        /* (Other attributes of the entry are automatically
        deleted.) */
```

The "read" operation might, in different systems, either read all aliases at once or read them one at a time. In the latter case, the read- and delete- steps would have to be repeated until there are no more aliases. Finally, the object itself is deleted.

The aliases can be located easily and deleted by providing the entry object with a pointer to each alias that is created. Thus, in FIG. 4 the entries and their aliases point to each other. This can be accomplished by making each alias object a child of the primary object.

FIGS. 4A and 4B show, respectively, possible structures of the entry object 410 and alias object 420 shown in FIG. 4. Object 410 includes a header 430 with the object ID, a pointer to a parent object (if any), a pointer to the child object 420, and other pointers to child objects (if any). The body 440 of object 410 includes attribute names and values, including common name, address, telephone number, alias information, and whatever other attributes the object may have. In this example, the common name Isomato Takahashi is encoded in the Printable String script. The object 410 may include other aliases or attribute information (indicated by •••).

FIG. 4B likewise includes a header with an object ID, and includes the common name Isomato Takahashi in T.61/JIS208 script, along with a pointer to the parent (primary entry) object 410 and any other information that the user may wish to added (indicated by •••).

Other object structures for these objects are acceptable, as long as they provide the capabilities discussed above for multiscript information access according to the procedures of the invention, including necessary cross-referencing among aliases for information retrieval and object modification and deletion.

I claim:

1. A system for providing multiscript access by a directory user agent (DUA) to attributes of entry objects in a directory information tree (DIT) stored in a directory service agent (DSA) server, the DUA comprising a first application resident in a memory of a user station having a first processor, and the DSA comprising a second application resident in a memory of the server, the server having a second processor and connected to the user station for receiving and processing requests regarding attributes of said entry objects, the system including:

means for providing a name for an entry object, the name being expressed in a first script, and storing the name in the entry object in the DIT;

input means for inputting at least one attribute of the entry object and a value for that attribute, and storing the attribute and value in the DIT;

means for providing an alternative name for the entry object, the alternative name being expressed in a second script, and storing the alternative name in the entry object in the DIT;

means for providing at least one alias object including the alternative name, said alias object including a pointer to the entry object;

access means for accessing said entry object when a value of said attribute is requested by reference to the alias object, and for returning the value of said requested attribute.

2. The system of claim 1, further including:

means for providing a pointer from the entry object to each said alias object; and deleting means for deleting each said alias object upon a command to delete the entry object, before the entry object is deleted.

3. The system of claim 1, wherein said means for providing at least one alias object comprises an application module of said DUA.

4. A method for providing multiscript access by a directory user agent (DUA) to attributes of entry objects in a directory information tree (DIT) stored in a directory service agent (DSA) server, the DUA comprising a first application resident in a memory of a user station having a first processor, and the DSA comprising a second application resident in a memory of the server, the server having a second processor and connected to the user station for receiving and processing requests regarding attributes of said entry objects, the method including the steps of:

(1) providing an entry object expressed in a first script;

(2) storing the entry object in the DIT;

(3) providing an attribute of the entry object and a value for that attribute;

(4) storing the attribute and its value in the DIT;

(5) providing an alternative name for the entry object, the alternative name being expressed in a second script;

(6) storing the alternative name in the entry object in the DIT;

(7) providing an alias object including the alternative name and a first pointer from the alias object to the entry object;

(8) upon a request for information regarding the value of said attribute, where the request references the alternative name, providing the request to the DSA with reference to the alternative name, including the first pointer; and (9) reformulating the request to make reference to the entry object.

5. The method of claim 4, wherein step 7 further includes the step of providing an additional pointer from the entry object to each said alias object.

6. The method of claim 5, further including, upon a delete command, the steps of:

(10) locating the alias object pointed to by each said additional pointer;

(11) deleting each alias object located in step 10; and

(12) deleting the entry object.

7. The method of claim 4, wherein:

said DUA is an application resident in an end-user station;

said DSA is an application resident in a DIT server;

steps 5–8 are initiated by an application module of said DUA; and steps 1–4 and 9 are initiated by an application module of said DSA.

8. A system for providing multiscript access to at least one entry object stored in a memory including a database, for retrieving a value of a first attribute of said entry object, and for outputting said value to a user, the system comprising a computer program for execution by a processor coupled to said memory, including:

means for providing a primary name for the entry object, the primary name being encoded for a first script;

means for providing an alternative name for the entry object, the alternative name being encoded for a second script;

means for providing at least one alias object comprising said alternative name;

access means for retrieving said value of said first attribute upon receiving a user request specifying said primary name and said first attribute;

access redirection means for reconfiguring a user request specifying said alternative name and said first attribute into a user request specifying said primary name and said first attribute; and means for outputting said value of said first attribute to said user.

9. The system of claim 8, wherein said means for providing at least one alias object includes means for providing a pointer from said alias object to said primary object.

10. The system of claim 8, wherein said alias object is a child of said primary object.

11. The system of claim 8, including means for providing a pointer from said primary object to each said alias object.

12. The system of claim 8, further including deleting means for deleting each said alias object upon a command to delete said primary object.

13. The system of claim 12, including means for providing a pointer from said primary object to each said alias object, wherein said deleting means includes means for locating each said alias object by means of said pointer.

* * * * *